Dec. 22, 1936.  O. F. PEDERSEN  2,065,019
SAFETY HOPPER
Filed Aug. 5, 1935
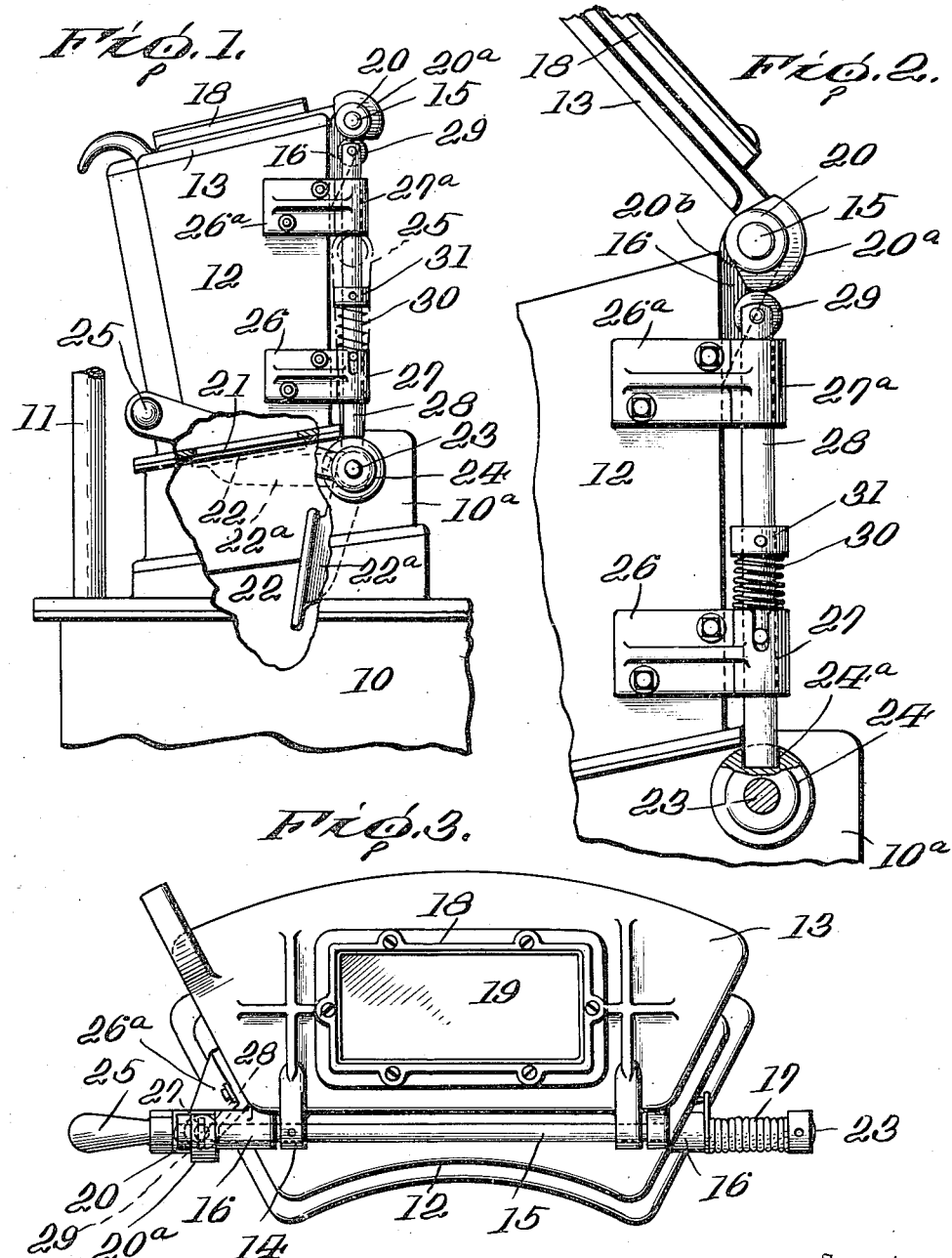
Inventor
Oscar F. Pedersen
By Mason + Porter
Attorneys Patented Dec. 22, 1936

2,065,019

UNITED STATES PATENT OFFICE 2,065,019

SAFETY HOPPER

Oscar F. Pedersen, Chicago, Ill., assignor to Phoenix Metal Cap Company, Inc., Chicago, Ill., a corporation of New York Application August 5, 1935, Serial No. 34,823

10 Claims. (Cl. 220—36)

The present invention relates to new and useful improvements in safety devices for preventing the escape of volatiles from mixing tanks and more particularly to a safety hopper through which materials are delivered to the tank.

The principal object of the invention is to provide, for use with a mixing tank, a safety hopper which prevents the escape of volatiles from the tank while the same is being charged or the contents thereof inspected.

A further object of the invention is to provide an improved safety hopper of the above type, wherein access to the hopper can only be had when communication between the tank and the hopper is closed and wherein communication between the tank and the hopper can only be opened when the interior of the hopper is shut off from the atmosphere.

The above and other objects of the invention will in part be obvious and will be hereinafter more fully pointed out.

In the accompanying drawing:

Fig. 1 is a side elevation, partly in section, showing the improved hopper in position on a mixing tank.

Fig. 2 is an enlarged fragmentary side elevation of the same, partly in section, showing the hopper door in an open position.

Fig. 3 is a top plan view of Fig. 1.

In the mixing of materials, which give off volatiles or injurious fumes, it is desirable to prevent the escape of these fumes during the charging of the tanks and during the inspection of the contents thereof inasmuch as the accumulation of the volatiles may be dangerous from the standpoint of safety and from the standpoint of the health of the operators. This is particularly true in the preparation of rubber compositions wherein the dry rubber is mixed with a volatile solvent, such as benzol, which gives off injurious fumes. The present invention aims generally to provide an improved safety hopper on a mixing tank in which rubber compositions are prepared. The hopper is fixed on a mixing tank and is provided with a top closing door and a bottom dumping floor which are connected in such a manner that the top door cannot be opened unless the dumping floor is closed, thus shutting off communication between the tank and the hopper while material is delivered to the hopper. The dumping floor of the hopper cannot be opened to permit the material in the hopper to be delivered to the tank until the top door of the hopper is closed, thus shutting off the hopper from the atmosphere. In this manner, the fumes from the tank are prevented from escaping to the atmosphere.

It is believed that the invention will be better understood by referring to the accompanying drawing, in which one embodiment of the invention is shown for purposes of illustration. A volatile solvent, such as benzol or the like, is admitted to the mixing tank 10 through a pipe 11. The dry ingredients, rubber in the present case, are admitted to the tank 10 through a hopper 12 which is mounted on the top of the tank. A door 13 for closing the top of the hopper is provided with rearward projections 14 which are fixedly mounted on a shaft 15. The shaft 15 is carried by bearing blocks 16 which project from the rear wall of the hopper 12. A spring 17 encircling one end of the shaft 15 tends to normally urge the door 13 to a closed position. The door 13 is provided with a central opening over which is secured a frame 18 carrying a wire glass 19 so that the contents of the tank may be inspected from time to time. On one end of the shaft 15 is a cam 20 extending beyond the side wall of the hopper. The cam 20 is provided with a raised portion 20a and a low portion 20b.

A portion of the bottom 21 of the hopper 12 is cut away to provide a dumping floor 22 which is carried by brackets 22a fixed on a shaft 23 rotatably mounted in the neck portion 10a of the mixing tank 10. The shaft 23 projects beyond the neck 10a and the end thereof, which is beneath the cam 20, is provided with a collar 24 and a handle 25. The collar 24 is provided with a radial slot or recess 24a, the purpose of which will be hereinafter pointed out.

There are mounted on the side of the hopper 12 between the shafts 15 and 24, brackets 26, 26a having cylindrical ends 27, 27a respectively. A bar 28 is carried by the ends of the brackets 26, 26a and is capable of a reciprocatory movement relative thereto. The bar 28 carries at its upper end a roller 29 which cooperates with the cam 20, in a manner presently to be described. A spring 30 encircling the bar 28 tends to normally hold the bar in a raised position by bearing on a collar 31 which is carried by the bar.

When the dumping floor 22 of the hopper 12 is closed, as shown by the dotted line position of the handle 25 and floor 22 in Fig. 1, the recess 24a in the collar 24 is disposed in alignment with the locking bar 28. The top closing door 13 of the hopper 12 may be opened when the dumping floor is closed. The opening of the top door 13 causes a clockwise rotation of the cam 20 on the shaft 15 so that the raised portion 20a on the cam engages the roller 29 on the bar 28 and forces the bar downwardly against the action of the spring 30. This movement of the bar will position the lower end thereof in the recess 24a (Fig. 2) so as to prevent the opening of the dumping floor 22 when the top door 13 is open, thus preventing the escape of fumes from the mixing tank 10. The dry materials may then be placed in the hopper. The closing of the top door 13 will then rotate the cam 20 in a counterclockwise direction which will bring the low portion 20b thereof over the top of the locking bar 28. Thus the locking bar 28 will be forced upwardly under the influence of the spring 30 so as to raise the lower end thereof out of the recess 24a in the collar 24. The dumping floor 22 may then be opened to permit the material in the hopper to fall into the tank by rotating the handle 25 to the position shown in full lines in Fig. 1. In this position, it will be seen that the recess 24a in the collar 24 has been moved out of alignment with the bar 28. It is now impossible to open the top door 13, because the raised portion 20a of the cam 20 bearing on the roller 29 on the bar 28 will prevent the rotation of shaft 15 since the lower end of the bar 28 bears directly on the collar 24.

When the dumping floor 22 is open, an operator may inspect the contents of the tank 10 through the wire glass 19. The top door 13 cannot be opened until the dumping floor 22 has been closed. When both the floor 22 and the door 13 are closed, it will be seen that a double seal is provided for preventing the escape of fumes.

From the foregoing description, it will be seen that an extremely simple and efficient device is herewith provided and it is to be clearly understood that minor changes in the details of construction and arrangement of parts may be made without departing from the scope of the invention as set forth in the appended claims.

Having thus described the present invention, what I claim as new and desire to secure by Letters Patent, is:

1. In a hopper, the combination of a top closing door, a lower shaft, a bottom dumping floor mounted on said shaft, a collar mounted on said shaft and having a recess of limited peripheral extension, and means actuated by the movement of said top door to and from a closed position and engaged in said recess when said door is open for preventing the opening of said dumping floor until said top door is closed.

2. In a hopper, the combination of a top closing door, a lower shaft having a collar at one end thereof, a bottom dumping floor mounted on said shaft, and means cooperating with said collar for preventing the opening of said top door until said dumping floor is closed.

3. In a hopper, the combination of an upper shaft, a top closing door mounted on said shaft, a cam on one end of said shaft, a bottom dumping floor, and means actuated by the movement of said cam for preventing the opening of said dumping floor until said top door is closed.

4. In a hopper, the combination of a top closing door, a bottom dumping floor, a reciprocable bar carried by the hopper, means operable upon the opening of said top door for depressing said bar, and means associated with said dumping floor for preventing the depression of said bar until said dumping floor is in a closed position whereby to prevent the opening of said top door until said dumping floor is closed.

5. In a hopper, the combination of a reciprocable bar mounted on said hopper, an upper rotatable shaft, a top door mounted on said shaft, a cam fixed on said shaft and having a low portion thereof in contact with the upper end of said bar when the top door is closed, a lower rotatable shaft, a dumping floor mounted on said lower shaft, and a collar fixed on said lower shaft and contacting with the lower end of said bar when the dumping floor is open whereby to prevent the opening of said top door, said collar having a radial recess in line with said bar when said dumping door is closed whereby to permit the opening of said top door through the depression of said bar by the raised portion of said cam.

6. In a tank for mixing materials which liberate fumes, the combination of a hopper sealed on the end of said tank, a bottom dumping floor for closing communication between said tank and said hopper, a top door for shutting off said hopper from the atmosphere, a reciprocable bar mounted on said hopper, means controlled by the opening of said top door for depressing said bar and locking said dumping floor in a closed position, and means associated with said dumping floor for preventing the depression of said bar and the opening of said top door until said dumping floor is closed.

7. In a hopper, the combination of a top closing door, a bottom dumping floor, locking means for said door and said floor for preventing the opening of either one until the other is completely closed, and means when the open door or floor is completely closed for releasing said locking means whereby to permit the opening of the door or floor which was previously closed.

8. In a hopper, the combination of a top closing door, a bottom dumping floor, locking means including a shiftable member cooperating with said door and with said floor for preventing the opening of either one until the other is completely closed, and means operative when the open door or floor is completely closed for permitting the shifting of said shiftable member to release said locking means whereby to permit the opening of the door or floor which was previously closed.

9. In a hopper, the combination of a top closing door, a bottom dumping floor, locking means disposed between said door and said floor, and means associated with said door and with said floor and movable therewith for cooperating with said locking means to prevent the opening of either the door or the floor until the other is completely closed.

10. In a hopper, the combination of an upper shaft carrying a closing door, a lower shaft carrying a dumping floor, locking means disposed between said shafts, and means on said shafts cooperating with said locking means for preventing the opening of either the door or the floor until the other is completely closed.

OSCAR F. PEDERSEN.